United States Patent [19]
Yamazaki et al.

[11] Patent Number: 5,109,292
[45] Date of Patent: * Apr. 28, 1992

[54] LIQUID CRYSTAL DEVICE HAVING RESIN LAYER FORMED BETWEEN ADJACENT ACTIVE ELEMENTS

[75] Inventors: Shunpei Yamazaki, Tokyo; Toshimitsu Konuma, Atsugi; Toshiji Hamatani, Atsugi; Akira Mase, Atsugi; Toshiharu Yamaguchi, Zama; Mitsunori Sakama, Hiratsuka; Takashi Inujima, Atsugi, all of Japan

[73] Assignee: Semiconductor Energy Laboratory Co., Ltd., Kanagawa, Japan

[*] Notice: The portion of the term of this patent subsequent to May 9, 2006 has been disclaimed.

[21] Appl. No.: 679,135

[22] Filed: Mar. 28, 1991

Related U.S. Application Data

[60] Continuation of Ser. No. 355,339, May 23, 1989, abandoned, which is a division of Ser. No. 928,489, Nov. 10, 1986, abandoned.

[30] Foreign Application Priority Data

Nov. 11, 1985 [JP] Japan .................................. 60-252426

[51] Int. Cl.⁵ .............................................. G02F 1/13
[52] U.S. Cl. ........................................ 359/62; 359/54; 359/104
[58] Field of Search ............... 350/339 R, 332, 331 R, 350/333, 350 S, 351

[56] References Cited

U.S. PATENT DOCUMENTS

| | | | |
|---|---|---|---|
| 4,367,924 | 1/1983 | Clark et al. | 350/350 S |
| 4,675,699 | 6/1987 | Kan et al. | 350/351 |
| 4,709,991 | 12/1987 | Hoshikawa | 350/339 R |
| 4,712,875 | 12/1987 | Tsuboyama et al. | 350/350 S |
| 4,738,515 | 4/1988 | Okada et al. | 350/350 S |
| 4,744,639 | 5/1988 | Tsuboyama | 350/350 S |
| 4,775,225 | 10/1988 | Tsuboyama et al. | 350/350 S |
| 4,780,794 | 11/1988 | Mase et al. | 361/401 |
| 4,818,429 | 4/1989 | Saito et al. | 350/350 S |
| 4,828,363 | 5/1989 | Yamazaki | 350/339 R |

FOREIGN PATENT DOCUMENTS 2079024  1/1982  United Kingdom ............ 350/339 R Primary Examiner—Stanley D. Miller
Assistant Examiner—Trong Phan
Attorney, Agent, or Firm—Sixbey, Friedman, Leedom & Ferguson

[57] ABSTRACT

An improved liquid crystal device immune to contamination of the liquid crystal is shown. The liquid crystal is isolated from ion sources such as glass substrates, transparent electrodes or so on by means of a nitride layer positioned therebetween.

7 Claims, 2 Drawing Sheets

LIQUID CRYSTAL DEVICE HAVING RESIN LAYER FORMED BETWEEN ADJACENT ACTIVE ELEMENTS

This application is a continuation of Ser. No. 07/355,339, filed May 23, 1989, now abandoned, which was a divisional of U.S. Ser. No. 928,489, filed Nov. 10, 1986, abandoned.

BACKGROUND OF THE INVENTION

The present invention relates to liquid crystal devices and manufacturing method thereof and, more particularly, to a novel liquid crystal device and manufacturing method for same, with a long life time of the device available at a low cost.

Liquid crystal devices such as compact displays having light weight are broadly used in the fields of microcomputers, word processors, compact television system or so on. For instance, the display operates best in the parallel nematic configuration. wherein the elongated axes of both the liquid crystal molecules, light-absorbing dichroic dye molecules are aligned in the same direction parallel to the wall of the display cell, in the electrically unexcited state. In this condition, the molecules in cooperation with polarizer absorb the majority of incident light, and render the background of the display, as well as any unactivated pixels, to a dark condition. The pixels are electrically excited to align the molecules perpendicular to the cell walls and achieve less-absorbing state displaying relatively bright area against the dark background. Thus, the pixels can be energized between bright and dark conditions.

Such liquid crystal displays are usefull especially for a diplay a large panel area which includes 200×400 pixels for example. As one of liquid crystals available for the displays, twisted nematic type has been used frequently. Liquid crystal of this type is not so susceptible to impurity such as alkali metal contained in opposed glass substrates, especially impurity phosphorus or boron.

Recently, on the other hand, liquid crystals of other type has been reported as promising materials for some liquid crystal appliances. For instance, chiral smectic phase is coming to fruition in some fields. The smectic phase, however, imparts high viscosity to liquid crystal at a room temperature so that it is necessary to lower the viscosity by raising the temperature of the liquid crystal up to 120° to 150 C.° to charge the liquid crystal into the narrow space between opposed substrates. Because of this, the high temperature undesirably promotes diffusion of impurity such as sodium into the liquid crystal from a conductive transparent electrode or a glass substrate contiguous to the liquid crystal. In case of a passive device, both the opposed insides of the substrates are in contact with the liquid crystal, making the device degraded during long time use at a range between a room temperature and 50C.°. In case of active device, while the active element provision side of the device can be covered with a high purified polyimide, the opposite inside is exposed to the liquid crystal.

SUMMARY OF THE INVENTION

In order to solve the above problems, a liquid crystal device according to the invention is provided with a impurity blocking film on the inside of the space of the device for containing the liquid crystal, particular on a glass substrate or a conductive transparent electrode. The blocking layer is to be prepared in advance of filing process of liquid crystal. The suitable materials for the blocking layer are nitrides, for example, silicon nitride, aluminium nitride, boron nitride, magnesium nitride, tin nitride, antimony nitride, indium nitride or blended composition thereof.

It is therefore an object of the invention to provide a liquid crystal device having high performance without suffering contamination of the liquid crystal in the device.

It is another object of the invention to provide a method for processing liquid crystal devices having high performance.

BRIEF DESCRIPTION OF THE INVENTION

DETAILED DESCRIPTION OF THE PREFERRED EMBODIMENTS

Figure 1:
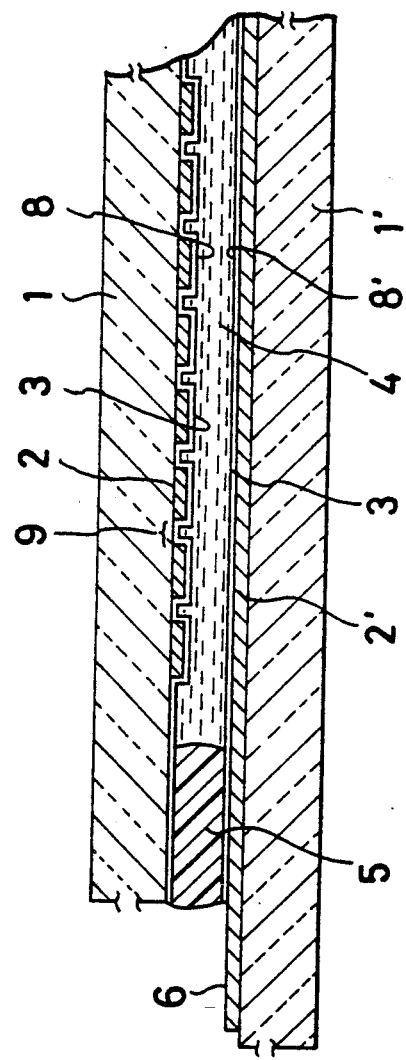
FIG. 1 is a cross section view showing a liquid crystal display according to the invention.

Referring to FIG. 1, a liquid crystal display of passive type according to the invention is illustrated. The embodiment comprises opposed substrates 1 and 1' of glass panes such as Coning 7059 on whose insides 8 and 8' are formed a plurality of electrode strips 2 arranged parallel with each other and a plurality of electrode strips 2' also arranged parallel with each other and extending perpendicular to the strips 2. The distance between the substrates 1 and 1' is 0.5 to 4 micron meter. A room or space is defined between the substrates 1 and 1' in air tight manner with a sealing means (not shown in the figure). Between the electrode strips 2 (2') and the substrate 1 (1'), the liquid crystal layer 4 of smectic C phase is disposed therebetween, color filters may be provided to make the device a color display, if desired. The contiguous surfaces to the liquid crystal are the inside surfaces of the electrode strips 2 and 2' and the inside surfaces 9 of the substrate 1 and 1' which are provided and exposed between adjacent ones of the electrode strips. On the contiguous surfaces are formed silicon nitride films 3 and 3' with 20 to 2000 Å, 200 Å in thickness for example.

Liquid crystal material between the substrates 1 and 1' is a blend of ferroelectric liquid crystal such as S8 (P-ochtyloxybenzylidene P'-aminomethylebuthylbenzoate) and B8 (2-methylbuthyl-4-ochtyloxybiphenyl-carboxylate), DOBAMBC (2-dechtyloxybenzilidene-4-aminomethylbuthylcinnamate) or other liquid crystals and blends thereof. For reference, some ferroelectric liquid crystals are shown in Japanese Patent Laid Open Nos. 56-107216, 56-118745 and 59-98051.

Although not shown in the figure, the contiguous surfaces are oriented, for example, by rubbing. Instead, the oriented surface may be present by further provision of oriented film over the silicon nitride film. In the case, most contiguous surfaces are the oriented films in place of the silicon nitride films. Furthermore provided below the silicon nitride may be disposed a shadow treatment mask for black matrix, an active device or so on.

The charging process of the liquid crystal material is carried out according to either of the following two methods.

According to the first method, the substrates 1 and 1' are assembled in advance opposing to each other with the silicon nitride films 8 and 8'. The periphery of the assembly is sealed off by a sealing member 5 made of epoxy resin except an injection aperture as an access. Next, the injection aperture is dipped into an amount of liquid crystal under negative pressure in a vacuum chamber and the liquid crystal is heated to 120° to 150 C.°. Then, the pressure in the chamber is returned to the atomospheric pressure. In virtue of differential pressure between the atmospheric pressure and the inside of the room between the opposed substrates to be charged liquid crystal, the liquid crystal is let enter into the cavity. Finally the aperture is closed by sealing material to prevent the liquid crystal from being contaminated by impurity in atomospher and from leakage.

Although depending on the area of the display, it takes several hours to complete the filing process, normally 1 to 30 hours. The substrate and the liquid crystal material are in contact at the high temperature during the filing process. However, since the silicon nitride films are disposed as blocking layers between the liquid crystal and the substrates, no impurity is to enter the liquid crystal from the substrates or the conductive transparent layer.

According to the second method, an amount of liquid crystal is placed on one of the substrates in advance of assembling of the substrates 1 and 1'. The substrate with the amount of liquid crystal is mated with the counterpart substrate under negative pressure in a vacuum chamber. Simultaneously the substrate is heated to 120° to 150 C.°. Finally the periphery of the substrates is sealed off with sealing means.

Anyway, the liquid crystal has a low viscosity during the charging step in virtue of the high temperature and the desired characteristics of the liquid crystal for operation of the device is recovered at a room temperature. For instance, the liquid crystal assumes of isotropic state having low viscosity at a high temperature during the filling step and smectic phase having high viscosity at room temperature.

Figure 2:
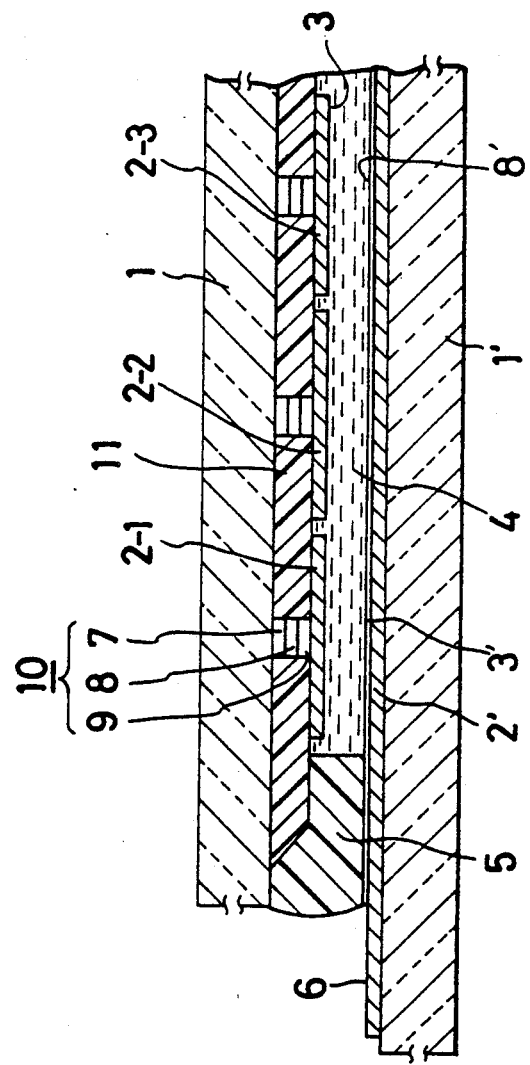
FIG. 2 is a cross section view showing another embodiment of the invention.

Next, another embodiment of the invention will be described in conjunction with FIG. 2. On a substrate 1 are formed a plurality of nonlinear active elements, each being composed of electrodes 7 and 9 made of chromium and semiconductor layer 8 having n-i-n junctions therebetween. Further formed on the substrate 1 is a polyimide resin layer 11 adjacent to the nonlinear elements 10. The polyimide resin is immune to ion drift. Transparent electrodes 2-1, 2-2, . . . are formed on the resin layer 11 corresponding to each active element. Liquid crystal device of this type is shown in Japanese Patent Laid-Open No. 59-277414 applied by the applicant.

On the other substrate are electrode strips 2' having terminal ends for making contacts with circumferential circuitry and a silicon nitride films 8' as blocking layers with 200 Å in thickness. Liquid crystal to be charged into the space between the opposed substrates and charging method thereof are same as that of the foregoing embodiment so that redundant explanations will not be repeated According to experiments, memory devices of the invention did not show no degraded property after the device has been used for 1000 hours.

One side or both sides of the liquid crystal layer, a polarizing plate may be placed with the liquid crystal being of guest-host type or birefringent type. In case of a reflection type device, an electrode on the incident side is made transparent and the other reflective with only one polarizer. The liquid crystal layer can be of a guest-host type with an additive, for example, 3% of dye or pigment such as dichroic anthraquinone. High contrast will be seen when the tilted angle of liquid crystal is 45 degrees.

On the other hand, in case of a device of transmissive type or reflective type with a birefringent liquid crystal layer, a pair of polarizers are placed on the both outsides of the opposed substrates. In the case, a desirable tilted angle is about 22.5 degrees.

While the invention has been particularly shown and described with reference to preferred embodiments thereof, it will be understood by those skilled in the art that the foregoing and other modifications and changes in form and details may be made therein without departing from the appending claims. Some examples are disclosed in the followings.

As substrates to have an amount of liquid crystal therebetween, a pair of flexible sheet may be employed. For instance are chemically strengthened thin glass substrates with 0.3 to 0.6 mm in thickness and transparent heat-proof organic resin films made of such as polyimide, PAN and PET.

Active elements may be SCLAD (Space Charge Limited Amourphous Silicon Device) having a multijunction diode such as a n-i-n type diode or FETs of insulated gate type.

The invention may be applied to other liquid crystal appliances, for example, disc memories, speakers, infrared light sensor printers, or input device in which are formed a plurality of photo sensors arranged in the form of dots.

What is claimed is:

1. A liquid crystal device comprising:
   a pair of substrates;
   a plurality of active elements formed on one of said substrates;
   an electrode arrangement formed on said pair of substrates;
   either one or a pair of nitride films formed on the inside surfaces of the substrates;
   a liquid crystal disposed between said pair of substrates,
   wherein a resin layer is formed between adjacent active elements.

2. A liquid crystal device comprising:
   a pair of substrates;
   a plurality of active elements formed on one of said substrates;
   an electrode arrangement formed on said pair of substrates;
   a liquid crystal layer disposed between said pair of substrates,
   wherein a resin layer is formed between adjacent active elements; and
   wherein at least one of said substrates is flexible.

3. A liquid crystal device comprising:
   a pair of substrates;
   a plurality of active elements formed on one of said substrates;
   an electrode arrangement formed on said pair of substrates;
   a liquid crystal layer disposed between said pair of substrates,
   wherein a resin layer is formed between adjacent active elements.

4. The liquid crystal device of claim 3, 1, or 2 wherein said active elements are semiconductor devices.

5. The liquid crystal device of claim 3 wherein each of said active elements is composed of a semiconductor layer having a an N-type semiconductor-I type semiconductor-N-type semiconductor junction.

6. The liquid crystal device of claims 3, 1 or 2 wherein said liquid crystal layer comprises a ferroelectric liquid crystal material.

7. The liquid crystal device of claims 3, 1 or 2 wherein said resin layer comprises a polyimide resin.

* * * * *